(12) United States Patent
Lee

(10) Patent No.: US 7,665,760 B2
(45) Date of Patent: Feb. 23, 2010

(54) MOUNTING STRUCTURE OF A CURTAIN AIR BAG FOR A VEHICLE

(75) Inventor: Seong Hyeon Lee, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 92 days.

(21) Appl. No.: 11/646,117

(22) Filed: Dec. 26, 2006

(65) Prior Publication Data

US 2008/0088120 A1 Apr. 17, 2008

(30) Foreign Application Priority Data

Oct. 12, 2006 (KR) .................... 10-2006-0099439

(51) Int. Cl.
*B60R 21/213* (2006.01)

(52) U.S. Cl. .................. 280/730.2; 280/728.2

(58) Field of Classification Search .............. 280/728.2, 280/730.1, 730.2
See application file for complete search history.

(56) References Cited

U.S. PATENT DOCUMENTS

| 5,265,903 | A | * | 11/1993 | Kuretake et al. | ......... | 280/730.2 |
|---|---|---|---|---|---|---|
| 6,082,761 | A | * | 7/2000 | Kato et al. | ............... | 280/730.2 |
| 6,106,007 | A | | 8/2000 | Kretschmer et al. | | |
| 6,142,506 | A | * | 11/2000 | Patel et al. | ............... | 280/730.2 |
| 6,149,185 | A | * | 11/2000 | White et al. | ............. | 280/730.2 |
| 6,257,616 | B1 | * | 7/2001 | Nowak et al. | ............ | 280/730.2 |
| 6,523,887 | B1 | * | 2/2003 | Picken et al. | ............. | 280/730.2 |
| 6,705,636 | B2 | | 3/2004 | Takahara | | |
| 6,729,645 | B2 | | 5/2004 | Amamori | | |
| 6,793,241 | B2 | * | 9/2004 | Wallner et al. | ........... | 280/730.2 |
| 7,011,337 | B2 | * | 3/2006 | Aoki et al. | ................ | 280/730.2 |
| 7,077,424 | B2 | * | 7/2006 | Inoue | ....................... | 280/730.2 |
| 7,246,817 | B2 | * | 7/2007 | Tanase | .................... | 280/730.2 |
| 2004/0066022 | A1 | * | 4/2004 | Mori et al. | ............... | 280/730.1 |
| 2004/0251663 | A1 | * | 12/2004 | Heigl et al. | .............. | 280/730.1 |
| 2005/0173902 | A1 | * | 8/2005 | Boxey | ...................... | 280/730.2 |
| 2006/0138750 | A1 | * | 6/2006 | Park | ....................... | 280/728.2 |

FOREIGN PATENT DOCUMENTS

| JP | 2002-264760 | 9/2002 |
|---|---|---|
| JP | 2002-283945 | 10/2002 |
| JP | 2003-011766 | 1/2003 |
| JP | 2004-182038 | 7/2004 |
| KR | 2004-0072830 | 8/2004 |

* cited by examiner

*Primary Examiner*—Paul N Dickson
*Assistant Examiner*—Robert A Coker
(74) *Attorney, Agent, or Firm*—Morgan, Lewis & Bockius LLP

(57) ABSTRACT

The present invention relates to a mounting structure of a curtain airbag for a vehicle. An airbag cushion which is deployed by deploying pressure of an inflator is mounted between an inner side panel so as to stably deploy toward a cabin through a portion where a head lining and a pillar trim are matched. The inflator is installed between the inner side panel and an outer side panel, and the airbag cushion is installed between the head lining and the inner side panel.

4 Claims, 3 Drawing Sheets

MOUNTING STRUCTURE OF A CURTAIN AIR BAG FOR A VEHICLE

CROSS-REFERENCE TO A RELATED APPLICATION

This application claims priority to Korean Patent Application No. 10-2006-0099439 filed in the Korean Intellectual Property Office on Oct. 12, 2006, the disclosure of which is incorporated herein by reference.

BACKGROUND OF THE INVENTION (a) Field of the Invention

The present invention relates to a mounting structure of a curtain airbag for a vehicle.

(b) Description of the Related Art

Generally, a vehicle is provided with various safety devices for protecting an occupant in a vehicle crash. One example of a safety device in a vehicle includes an airbag.

The airbag is installed to a steering wheel and a crash pad. The airbag is configured to be deployed when a vehicle suffers a frontal crash, thereby protecting occupants in the vehicle. Additionally, a side airbag for absorbing impact due to a side crash has also been developed.

Meanwhile, pillars constituting a portion of a vehicle body are steel frames forming the framework of a door. The pillars are divided into a front pillar, a center pillar, and a rear pillar according to positions thereof. A pillar trim is attached to a surface of the pillar facing a cabin.

An inflator of the curtain airbag is provided in the same space with the airbag cushion. A shock absorbing structure, including a dampening rib for protecting the head of an occupant, is applied to the space for responding to FMH (free motion headform).

However, it is difficult to dispose the curtain airbag and the shock absorbing structure in the limited small space together.

SUMMARY OF THE INVENTION

The present invention provides a mounting structure of a curtain airbag for a vehicle by obtaining sufficient inner surface and thereby easily mounting a shock absorbing structure including a dampening rib for protecting the head of an occupant by installing a pipe type inflator between an inner side panel and an outer side panel, and installing an airbag cushion between a head lining and the inner side panel.

In an exemplary embodiment, a mounting structure of a curtain airbag for a vehicle is mounted between an inner side panel so as to deploy toward the passenger cabin through a portion where a head lining and a pillar trim are matched. The inflator is also installed between the inner side panel and an outer side panel, and the airbag cushion is installed between the head lining and the inner side panel.

In an exemplary embodiment, the inflator may be fixed to the inner side panel or the outer side panel by a mounting bracket surrounding an outer circumference thereof.

In an exemplary embodiment, the inflator may be fixed to the inner side panel by the mounting bracket which completely surrounds the outer circumference thereof.

Figure 1:
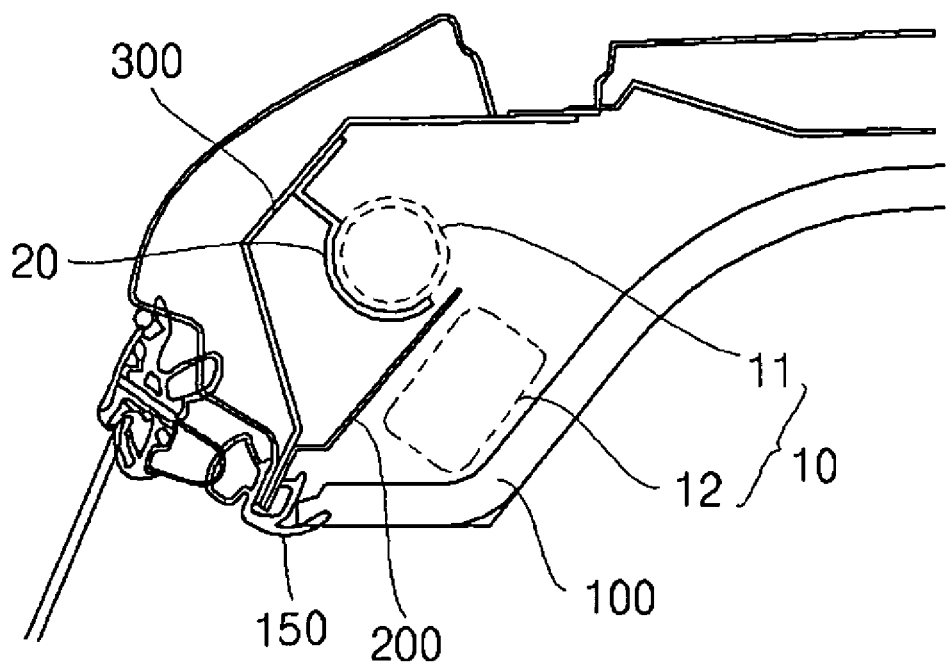
FIG. 1 to FIG. 3 are drawings showing mounting structures of a curtain airbag for a vehicle according to exemplary embodiments of the present invention.

<Description of Reference Numerals Indicating Primary Elements in the Drawings>

| 10: curtain airbag | 11: inflator |
|---|---|
| 12: airbag cushion | 20: mounting bracket |

DETAILED DESCRIPTION OF THE INVENTION

An exemplary embodiment of the present invention will hereinafter be described in detail with reference to the accompanying drawings.

Figure 5:
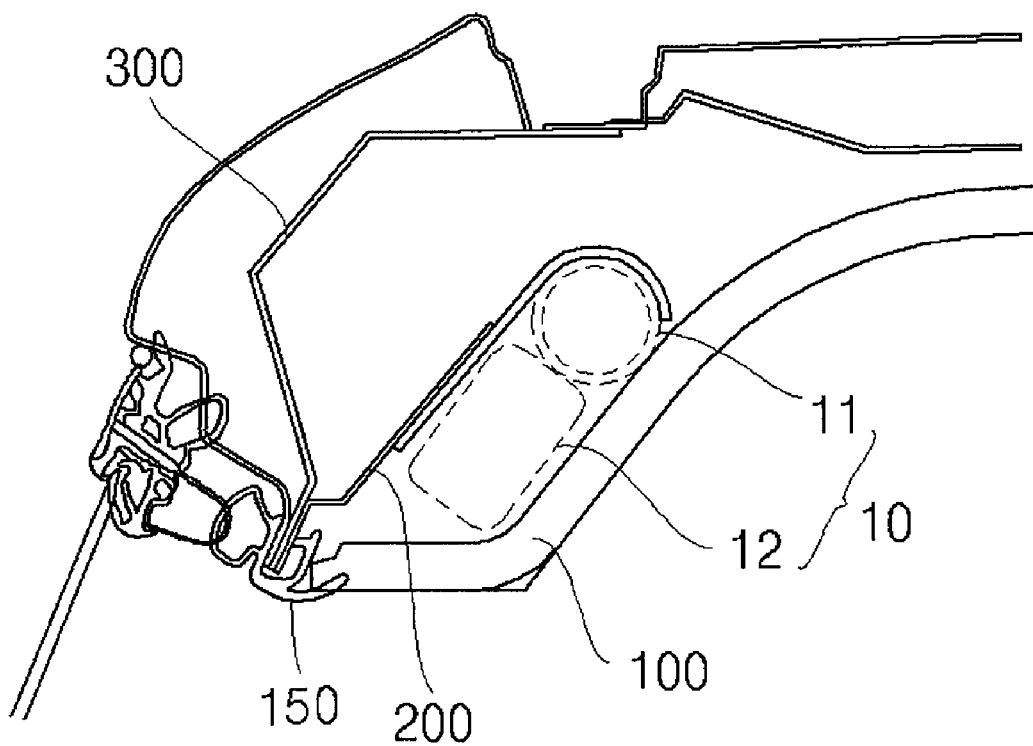
FIG. 5 is a drawing showing a conventional mounting structure of a curtain airbag for vehicles.

FIG. 5 is a drawing showing a conventional mounting structure of a curtain airbag for vehicles. In a curtain airbag 10 which is installed between a head lining 100 and an inner side panel 200, an airbag cushion 12 pushes an end portion of the head lining 100 toward a cabin by gas pressure, thereby deploying the airbag.

An inflator 11 of the curtain airbag 10 is provided in the same space with the airbag cushion 12. A shock absorbing structure (not shown) including a dampening rib for protecting the head of an occupant is applied to the space for responding to FMH (free motion headform).

Figure 2:
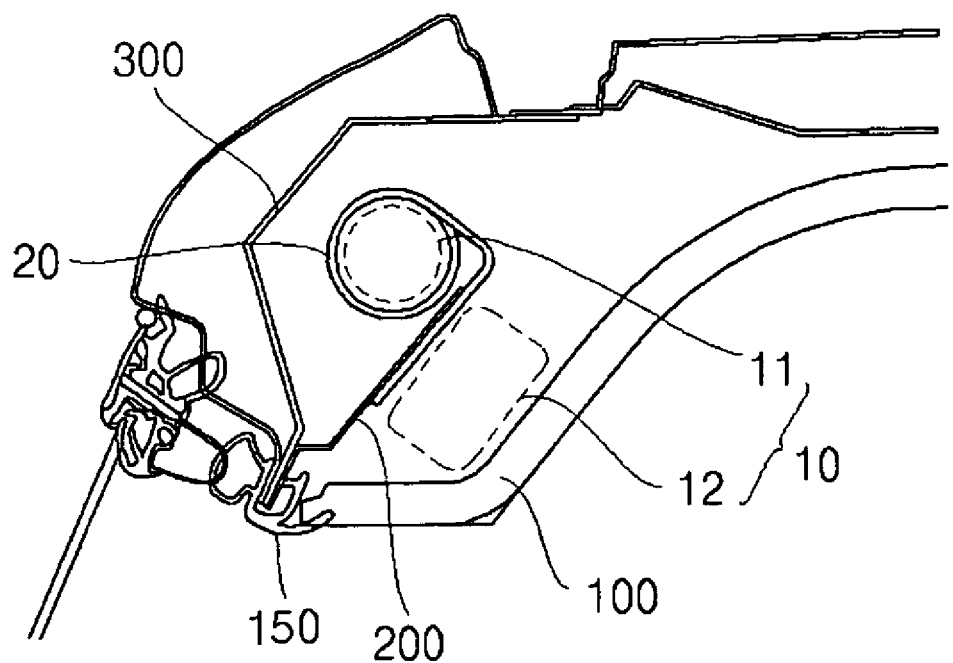
Figure 3:
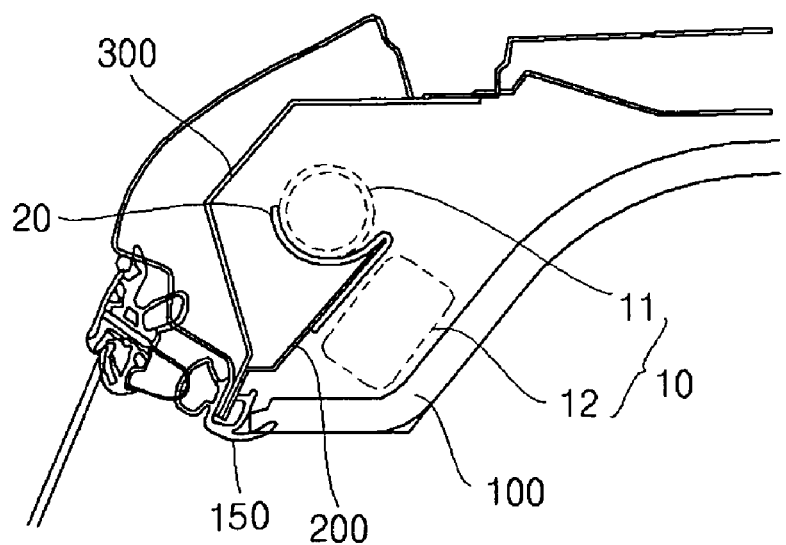
Figure 4:
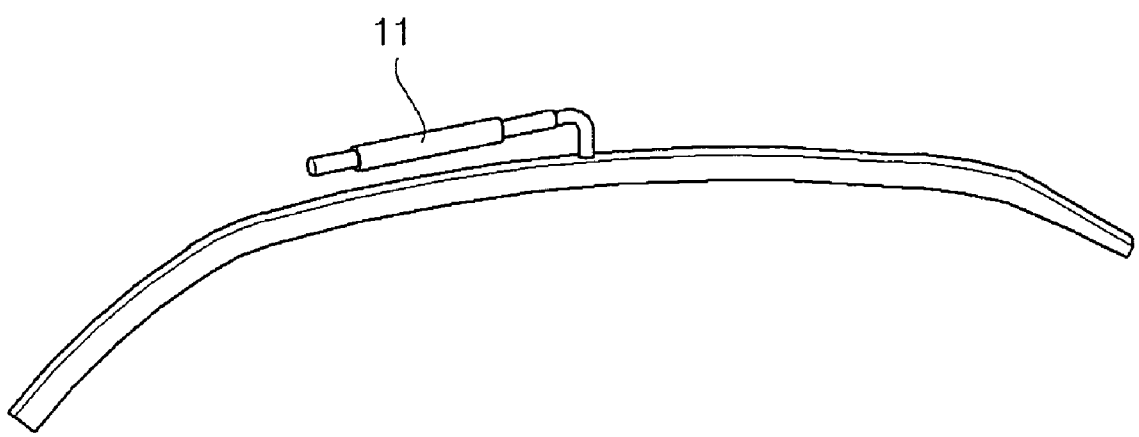
FIG. 4 is a drawing showing a general inflator of an airbag.

In FIGS. 1-3, since a curtain airbag 10 and a shock absorbing structure for responding to FMH should be positioned in a small space between a head lining 100 and a side inner panel 200, a pipe type inflator 11 of the curtain airbag 10 is moved to the inner side panel 200 and an outer side panel 300 so as to obtain a surplus space.

As described above, the curtain airbag 10 for a vehicle is installed between the head lining 100 and the inner side panel 200 which contacts with a pillar trim 150 of a center pillar with a predetermined expansion area, and protects an occupant in a side crash from injuries.

Here, an airbag module of the curtain airbag 10 includes an airbag cushion 12 and an inflator 11 which supplies high-pressure deploying gas so as to deploy the airbag cushion 12 toward a passenger cabin of a vehicle.

When the airbag module is installed between the head lining 100 and the inner side panel 200, in order to maximally use the space, the airbag cushion 12 is positioned between the head lining 100 and the inner side panel 200 so as to stably expand toward the passenger cabin through a portion where the head lining 100 and the pillar trim 150 are matched, and the inflator 11 is installed in a surplus space between the inner side panel 200 and the outer side panel 300, as shown in FIG. 3.

Since the airbag cushion 12 and the inflator 11 of the airbag module of the curtain airbag 10 are separately installed to separate surplus space in a vehicle body panel, a surplus space can be obtained. Accordingly, a shock absorbing structure (not shown) including a dampening rib for protecting the head of an occupant can be easily mounted.

As shown in the drawings, the inflator 11 is fixed to the inner side panel of the outer side panel 300 by a mounting bracket 20 which surrounds an outer circumference of the inflator 11. In an exemplary embodiment of the present invention, as show in FIG. 1, the mounting bracket 20 surrounds about half of the outer circumference of the inflator 11 and is fixed to the outer side panel 300. In another embodiment of the present invention, as shown in FIG. 2, the mounting bracket 20 completely surrounds the outer circumference of the inflator 11 and is fixed to the inner side panel 200. In yet another embodiment of the present invention, as shown in FIG. 3, the mounting bracket 20 surrounds about half of the outer circumference of the inflator 11 and is fixed to the inner side panel 200.

As described above, the inflator 11 installed between the inner side panel 200 and the outer side panel 300 by the mounting bracket 20 which supplies high-pressure deploying gas to the airbag cushion 12 which is installed between the head lining 100 and the inner side panel 200, thereby protecting an occupant in a vehicle side crash. In this case, a distance between the inflator 11 and the airbag cushion 12 has no relation with deployment time of the airbag cushion 12. In fact, the deployment time of the airbag cushion 12 relates to explosive pressure of the inflator 11, rather than a mounting position of the inflator 11.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mounting structure of a curtain airbag for a vehicle, comprising:
   an outer side panel;
   an inner side panel attached to the outer side panel;
   a pillar trim attached directly to the inner and outer side panels;
   a head lining attached to the pillar trim;
   an airbag cushion being disposed between the head lining and the inner side panel and configured for deployment between the head lining and the pillar trim; and
   an inflator disposed between the inner side panel and the outer side panel, and configured to deploy the airbag cushion.

2. The mounting structure of claim 1, wherein the inflator is attached to the inner side panel or the outer side panel by a mounting bracket.

3. The mounting structure of claim 2, wherein the inflator is attached to the inner side panel by the mounting bracket, and wherein the mounting bracket surrounds an outer surface of the inflator.

4. A mounting structure of a curtain airbag for a vehicle, comprising:
   an outer side panel;
   an inner side panel attached to the outer side panel;
   a pillar trim attached directly to the inner and outer side panels;
   a head lining attached to the pillar trim;
   wherein the inner side panel is disposed between the head lining and the outer side panel, such that a first space is defined between the inner side panel and the head lining, and a second, separate space is defined between the inner side panel and the outer side panel;
   an airbag cushion disposed in the first space and configured for deployment between the head lining and the pillar trim; and
   an inflator disposed in the second space and configured to deploy the airbag cushion.

* * * * *